United States Patent [19]

Muro

[11] Patent Number: 5,735,471
[45] Date of Patent: Apr. 7, 1998

[54] CRYOGENIC TIRE DISINTEGRATION PROCESS AND APPARATUS

[76] Inventor: Louis Muro, 435 Roy Ave., #106, Dorval, Quebec, Canada, H9S3E2

[21] Appl. No.: 768,930

[22] Filed: Dec. 18, 1996

Related U.S. Application Data

[60] Provisional application No. 60/008,885, Dec. 19, 1995.

[51] Int. Cl.$^6$ ................................................ B02C 19/12
[52] U.S. Cl. .................... 241/23; 241/24.17; 241/29; 241/79.1; 241/293; 241/DIG. 31; 241/DIG. 37
[58] Field of Search ........................ 241/23, 29, 79.1, 241/293, DIG. 31, DIG. 37, 24.17, 65

[56] References Cited

U.S. PATENT DOCUMENTS

| | | | |
|---|---|---|---|
| 3,241,777 | 3/1966 | Kuntz | 241/264 X |
| 4,025,990 | 5/1977 | Lovette, Jr. | 241/14 |
| 4,073,443 | 2/1978 | Danioni | 241/65 |
| 4,102,503 | 7/1978 | Meicass | 241/18 |
| 4,342,647 | 8/1982 | McMillan et al. | 209/3 |
| 4,726,530 | 2/1988 | Miller et al. | 241/24 |
| 4,813,614 | 3/1989 | Moore et al. | 241/23 |
| 4,863,106 | 9/1989 | Perkel | 241/5 |
| 5,203,513 | 4/1993 | Keller et al. | 241/30 |
| 5,246,172 | 9/1993 | Lamar | 241/41 |

FOREIGN PATENT DOCUMENTS

| | | | |
|---|---|---|---|
| 954103 | 9/1974 | Canada | 241/141 |
| 1136594 | 11/1982 | Canada | 241/137 |

*Primary Examiner*—John M. Husar
*Attorney, Agent, or Firm*—Mila Shvartsman

[57] ABSTRACT

The present invention relates to a method for disintegration of thermoplastic elastomeric materials containing fibres, wires or the like. This method comprises the following two steps: subjecting segments of the elastomeric materials to temperatures able to bring the segments into a brittle glass-like state (by means of a freezing chamber), and gradual disintegrating of the frozen segments by disintegrating means provided to separate the segments from the wires and fibres. This disintegration is effected by means of a bending force applied to the frozen segments causing them to break into small particles while the wires and fibres remain substantially intact. After the disintegration, separation of the small particles, wires and fibres takes place by separating means. The disintegrating means comprises a roll means, where the roll means is provided with mating bending surfaces spaced apart from each other at predetermined distances and facilitating maximum bending and breaking of the frozen segments being advanced between the roll means. The roll means may comprise two sets of rolls, where distance between the first set of rolls is bigger than the distance between the second set of rolls to facilitate gradual breaking of the frozen segments. The mating bending surfaces are a plurality of semi-spherical heads, where the heads are spaced from each other in such a way that heads on the mating surface of one roll are mating with a space between heads on the mating surface of another roll.

25 Claims, 5 Drawing Sheets

CRYOGENIC TIRE DISINTEGRATION PROCESS AND APPARATUS

This application is related to provisional application Ser. No. 60/008,885, filed Dec. 19, 1995.

This invention is related to the disintegration of thermoplastics, rubber and thermoplastic elastomeric materials, and more particularly, to recovery of rubber from rubber-based scrap articles such as reinforced rubber tires, thin cables, conveyer belts and other products.

There are known conventional cryogenic systems using chemicals. Those systems are not truly cryogenic. The tires are first shredded with two large shredders into 2"×2" pieces at ambient temperatures, and then are chemically frozen before being disintegrated in a hammer mill. This operation not only powders the rubber, but also powders the steel, and breaks the fibre to a cotton-like fluff that plugs screens and entraps rubber. Such known systems have the following disadvantages:

The shredders require substantial energy to tear the tire apart at ambient temperature—the temperature at which the tires are designed to be at their maximum for toughness and durability. The steel in the bead and belting is also shredded;

Wear and tear on the cutting edges of the shredders results in very high maintenance costs and downtime;

Maintenance costs and energy consumption for the hammer mills are, similarly high because the systems disintegrate the chopped steel along with rubber;

The steel powder end product has no resale value;

Separation of the fibre fluff requires an air aspiration system, which also removes up to 15% of the fine rubber reducing the crumb yield. The fibre fluff has no resale value;

Most cryogenic systems use costly liquid nitrogen or other chemicals that can be dangerous to handle and store;

There are also known ambient systems that use shredding and grinding equipment. Those systems are built around heavy duty, energy intensive equipment needed to break the tire down in stages at ambient temperature throughout before it is finally granulated to powder. Such systems have the following disadvantages:

High capital cost of $2 million and more;

The shredders require substantial energy to tear the tire apart at ambient temperature—the temperature at which they are designed to be at their maximum of toughness and durability. The steel in the bead and belting are also sheared;

Wear and tear on the cutting edges of the shredders is very high, resulting in high maintenance costs and downtime, which is typically 10% of the operating time;

Maintenance costs and energy consumption for the hammer mill are similarly high because the system disintegrates the chopped steel along with the rubber;

The rubber crumb is dirty and requires expensive separation equipment;

The steel powder end product has no resale value;

Separation of the fibre fluff requires an air aspiration system, which also removes up to 15% of the fine rubber reducing the crumb yield. The fibre fluff has no resale value.

There is also known CRT-1 system combining both ambient and non-chemical systems. This system is a slight improvement over conventional cryogenic systems; however it is not truly cryogenic. In this system, whole tires are shredded into two-inch chips at ambient temperature, and the chips are cooled to a glass state in a freezing chamber using cold air at −200 Fahrenheit. The frozen chips are then pulverized in a hammer mill to granulated rubber, steel and fibre before grading and removal. The disadvantages to this system are similar to those with chemical cryogenic and ambient process. Further, the system is expensive at up to $2.4 million.

A study in 1994 by General American Corporation recommended that companies use a non-chemical cryogenic process that separates the fibre, steel and crumb rubber to achieve a cleaner end product.

The tire disintegrating system and process according to the present invention would not have any of the abovementioned disadvantages, and incorporates new features. The system of the present invention would be environmentally safe, totally pollution free, and would cryogenically disintegrate tires into uncontaminated rubber powder, clean steel wire, and clean fibre cord without shredding them.

SUMMARY OF THE INVENTION

Broadly, the present invention relates to a method for disintegration of thermoplastic elastomeric materials containing fibres, wires or the like, comprising the following steps:

subjecting segments of said elastomeric materials to temperatures able to bring said segments into a brittle glass-like state by means of a freezing chamber;

gradual disintegrating of said frozen segments by disintegrating means provided to separate said segments from said wires and fibres, wherein said disintegration is effected by means of a bending force applied to said frozen segments causing them to be broken into small particles and wherein said wires and fibres remain substantially intact;

separating said small particles, wires and fibres by separating means.

In another embodiment, said disintegrating means comprises a roll means, wherein said roll means is provided with mating bending surfaces spaced from each other at predetermined distances and facilitating maximum bending and breaking of said frozen segments being advanced between said roll means. Said roll means comprises a first set of two rolls and a second set of two rolls, wherein distance between said first set of rolls is bigger than the distance between said second set of rolls to facilitate gradual breaking of said frozen segments advanced between said corresponding set of rolls. Mating bending surfaces of said first set of two rolls comprise a plurality of semi-spherical heads incorporated onto said mating surfaces, wherein said heads are spaced from each other in such a way that heads on the mating surface of one roll are mating with a space between heads on the mating surface of another roll.

In yet another embodiment of the present invention, said second set of two rolls comprises a plurality of a gear-shaped disks mounted on said rolls, said disks having teeth of a step-like configuration, and wherein disks on one roll are adapted to intermesh with corresponding disks on another roll such a way that a peak portion of a tooth working surface of one roll is facing a valley portion of the tooth working surface of the corresponding disk of another roll, thus providing maximum bending force applied to said frozen segments being advanced between said working surfaces. Said gear-shaped disks assembled on each of said rolls are spaced from each other by means of spacers, wherein said spacers facilitate bending and breaking of said frozen segments in a plane parallel to said rolls. Said gear-shaped disks are assembled in such a way that each even disk is rotated with relation to each odd disk so that the peak and valley working surfaces of said adjacent odd and even disks alternate, thus allowing to further facilitate bending and breaking of said frozen segments in a plane parallel to said rolls.

In still another embodiment of the present invention, said roll means further comprises an additional set of first rolls provided to break said frozen segments of larger size, wherein said additional set of first rolls is positioned prior to said first set of rolls. Heads of said additional set of first rolls having dimensions larger than the dimensions of said first set of rolls, and wherein said rolls are spaced from each other on larger distance. Teeth of said gear-shaped disks have edges of rounded configuration and are of symmetrical configuration. Said separation step comprises separation of said wires by a wire separation means and separation of said small particles of thermoplastic material and said fibres by a screen means.

In yet another embodiment, said separated small particles of thermoplastic material are conveyed through a heat exchange means provided to extract cold energy from said particles and transferring said energy back into an incoming section of a preparation chamber. The distance between said roll means is smaller than the thickness of the frozen segments being advanced between said roll means. Each of said heads is mounted on a base element, said base element is provided to additionally enhance bending and breaking of said frozen segments.

In still another embodiment, the present invention relates to an apparatus for disintegration of thermoplastic elastomeric material containing wires, fibres or the like comprising:

- a freezing chamber provided to subject segments of said the thermoplastic material to a temperature able to bring said materials into a brittle glass-like state;
- disintegration means having mating bending surfaces which are adapted to gradually disintegrate said frozen segments and allowing to completely separate said thermoplastic material from said wires and fibres, wherein said disintegration is effected by a bending force applied to said frozen segments being advanced between said bending surfaces, thus causing said segments to be bent and broken into small particles, and wherein said wires and fibres remain substantially intact;
- separation means adapted to completely separate said small particles of thermoplastic material, said wires and said fibres.

In yet another embodiment, said disintegrating means comprise a roll means, wherein said roll means provided with mating bending surfaces spaced apart from each other at predetermined distance and facilitating maximum bending and breaking of said frozen segments being advanced between said roll means. Said roll means comprises a first set of two rolls and a second set of two rolls, wherein distance between said first set of rolls is bigger than the distance between said second set of rolls to facilitate gradual breaking of said frozen segments advanced between said corresponding set of rolls. Mating bending surfaces of said first set of two rolls comprise a plurality of semi-spherical heads incorporated onto said mating surfaces, wherein said heads are spaced from each other in such a way that heads on the mating surface of one roll are mating with a space between heads on the mating surface of another roll.

In still another embodiment of the present invention, said second set of two rolls comprises a plurality of a gear-shaped disks mounted on said rolls, said disks having teeth of a step-like configuration, and wherein disks on one roll are adapted to intermesh with corresponding disks on another roll such a way that a peak portion of a tooth working surface of one roll is facing a valley portion of the tooth working surface of the corresponding disk of another roll, thus providing maximum bending force applied to said frozen segments being advanced between said working surfaces. Said gear-shaped disks assembled on each of said rolls are spaced from each other by means of spacers, wherein said spacers facilitate bending and breaking of said frozen segments in a plan parallel to said rolls. Said gear-shaped disks are assembled such a way that each even disk is rotated with relation to each odd disk so that the peak and valley working surfaces of said adjacent odd and even disks alternate, thus allowing to further facilitate bending and breaking of said frozen segments in a plan parallel to said rolls.

In yet another embodiment of the present invention, said roll means further comprises an additional set of first rolls provided to break frozen segments of larger size, wherein said additional set of first rolls is positioned prior to said first set of rolls. Heads of said additional set of first rolls having dimensions larger than the dimensions of said first set of rolls, and wherein said additional rolls are spaced from each other on larger distance. Teeth of said gear-shaped disks have edges of rounded configuration and are of a symmetrical configuration. Said separation means further comprises a magnetic means adapted to separate said wires and a screen means adapted to separate said small particles of thermoplastic material and said fibres. The distance between said roll means is smaller than the thickness of the frozen segments being advanced between said roll means, and each of said heads is mounted on a base element, wherein said base element is provided to additionally enhance bending and breaking of said frozen segments. Said segments of thermoplastic elastomeric material are tire treads, wherein said tire treads being preliminary separated from sidewall portions of said tires.

In still another embodiment of the present invention, said disintegrating means comprises a jaw means, wherein said jaw means is provided with mating bending surfaces spaced apart from each other at predetermined distance and facilitating maximum bending and breaking of said frozen segments being advanced between said jaw means. Said jaw means comprises a set of two jaws of generally flat configuration, wherein one of said two jaws is a stationary jaw and the second of said two jaws is a movable jaw, and wherein said bending surfaces comprise a plurality of protrusions incorporated into inner surfaces of said jaws, said protrusions are spaced from each other in such a way that protrusions on the mating surface of one jaw are mating with a space between protrusions on the mating surface of another jaw. The size and the distance between said protrusions gets progressively smaller in the direction toward an exit opening located near the bottom portion of the said two jaws. The size and the distance between said protrusions is smaller than the thickness of the frozen segments being advanced between said jaws.

DETAILED DESCRIPTION OF THE PRESENT INVENTION

The present invention is based on the fact that when the tire is frozen to at least −80 F., the rubber becomes very brittle, and is considered to be in a "glass state". In this glass state, the tire will fracture easily with little force, particularly when a bending force is applied to it.

The present invention comprises of at least 1 set of rolls to take advantages of such a brittle condition of the frozen tire. These rolls are provided with the bending surfaces to be spaced at short distances apart so no cutting action is applied to the steel wires in the tire.

FIGS. 2–7 shows the disintegration apparatus according to the first embodiment of the present invention and comprising two sets of rolls necessary to disintegrate car tires.

Figure 2:
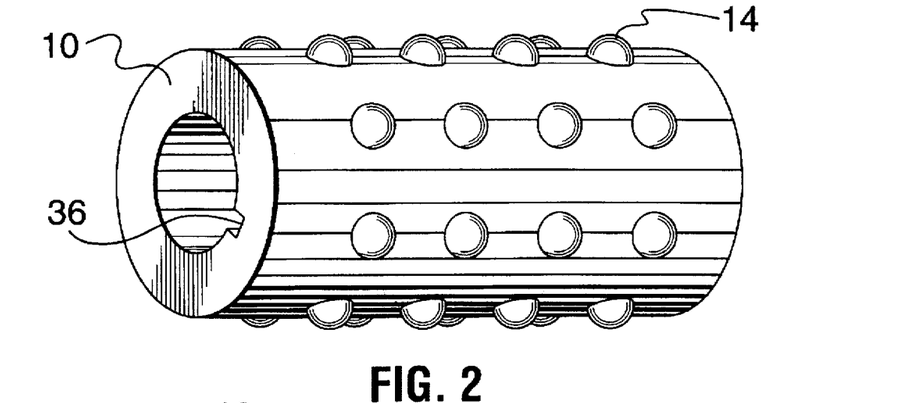
FIG. 2 shows a perspective view of one of the two sets of rolls provided with semi-spherical heads according to the first modification.
Figure 3:
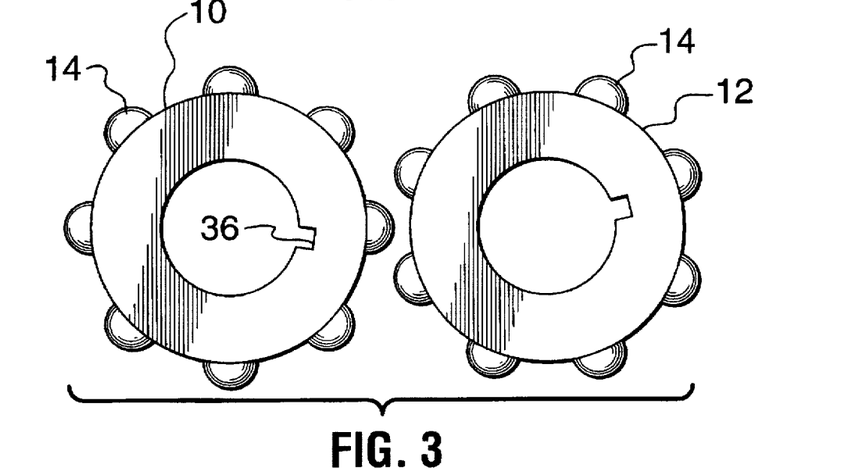
FIG. 3 shows a side view of the first set of rolls of the first modification.
Figure 4:
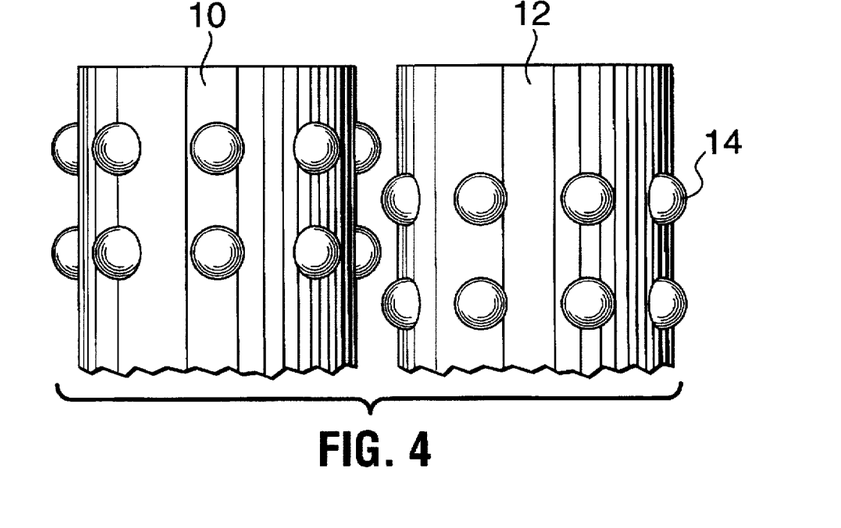
FIG. 4 shows a plan view of the first set of rolls of FIG. 3.

The first set of rolls 10 and 12 for a car tire have round or semi-spherical knobs or head bolts 14 incorporated or screwed into outer surfaces of those rolls 10 and 12 of about 3¹/²" in diameter (see FIGS. 2–4). The diameter of the rolls 10 and 12 is not very important, and from the practical point of view, may be from 2" to 3" in diameter, wherein size, ½" or 6' will be not practical. Each of rolls 10 and 12 is mounted onto driving shafts by means of keys (not shown) inserted into the corresponding grooves 36 formed within those rolls.

The rolls 10 and 12 are separated so that the closest distance between any two parts is about ½ of the average thickness of the piece of tire to be bent or broken. In the other words, a tire tread of ½" thick would require an optimum spacing of ¼" as shown on FIG. 3; however it is possible to have spacing varied from ⅛" to ⁷/₁₆". The rolls are spaced in such a way that each round bolt head 14 mates with the space between heads 14 the other roll (see FIG. 5). On this FIG. 5, the solid circles show round heads 14 on roll 10 and broken-line circles are those of roll 12. In view of the fact that the heads 14 are round, a piece of rubber between the two rolls is subjected to a bending force 180 degrees on it, so it would break into the maximum number of pieces.

Figure 5:
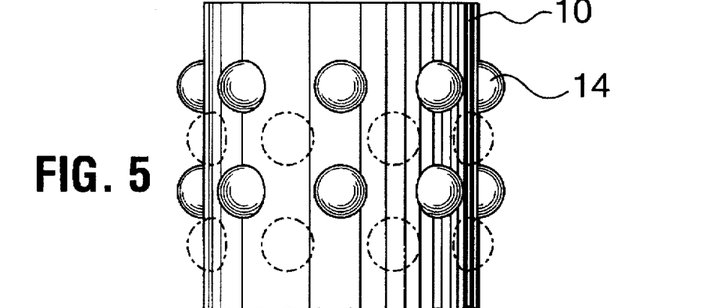
FIG. 5 shows schematic disposition of heads of the first set of rolls.

The present invention is not restricted to the semi-spherical shape of the heads 14, and any other shape allowing the maximum bending surfaces to break pieces of rubber may be used for the same purpose.

Figure 6:
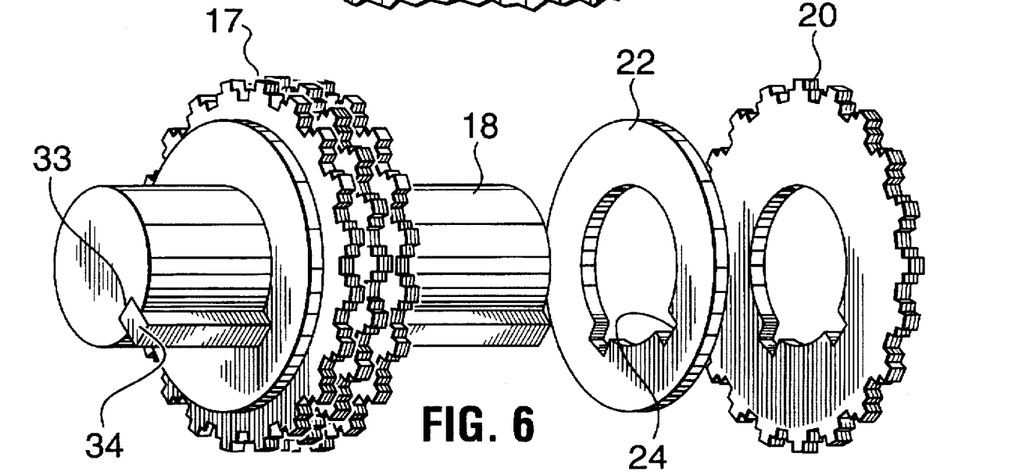
FIG. 6 is a fragmental perspective view of gears and spacers of the second set of rolls in disassembled mode showing alternation of peaks and valleys.
Figure 7:
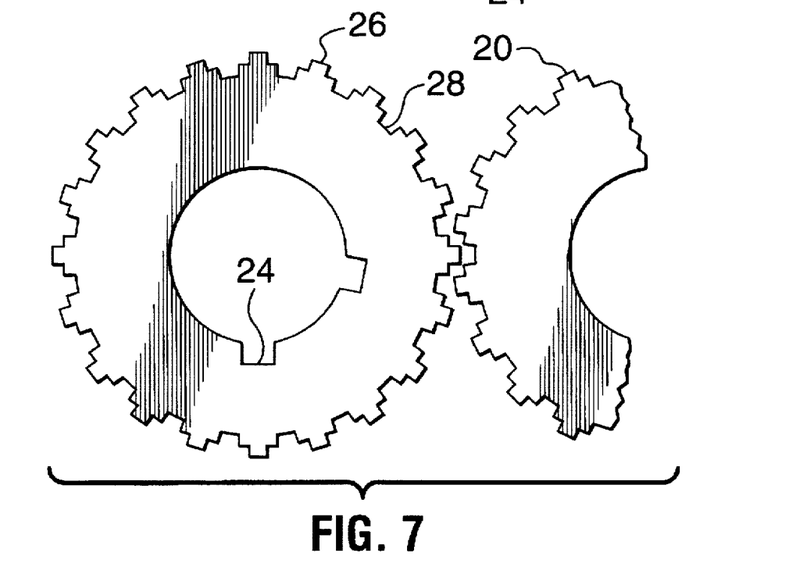
FIG. 7 shows a fragmental side view of gears of the second set of rolls in interaction.

In order to disintegrate the pieces of rubber into a smaller size, a second set of rolls 17 is used as shown on FIGS. 6 and 7. The second set of rolls 17 comprises a plurality of gears or disks 20 having a step-like symmetrical shape of teeth positioned such a way that the gears mounted on two shafts 18 are aligned, but not intermeshing with each other, wherein the peak 26 of the tooth working surface of the first gear 20 is facing a valley 28 of the tooth working surface of the corresponding second gear 20. Such orientation of corresponding gears is provided to facilitate maximum bending force applied to pieces of rubber placed between two mating surfaces of those gears 20. This way, rubber will bend at each point of the mating surface of the step-like teeth. Each of these plurality of gears 20 is spaced from each other on respective shafts 18 by means of spacers 22. The spacers 22 allow the rubber to be broken in the plane parallel to the shafts 18. Preferably, the thickness of a spacer 22 is around 0.118". The plurality of gears or disks 20 are assembled on the shafts 18 in such a way that each odd disk is rotated with relation to each even disk so that peaks and valleys alternate in relation to the working tooth surface. This assembly of disks 20 is better shown on FIG. 6. Such arrangement of positioning of said disks 20 is provided by means of two keyways or notches 24 formed within inner diameter of each gear 20, wherein one of said keyways 24 is pointed or aligned with the peak 26 of one tooth and the other is pointed or aligned with the valley 28 of the another tooth. Each shaft 18 upon which said gears or rolls are placed is provided with a groove 33 mirroring the shape of the gear's notch or key 24, wherein a key 34 in the shape of a square metal rod is inserted between the shaft's groove 33 and the gear's notch 24 when the, gear 20 is on the shaft in order to lock the gear 20 together with the shaft 18 into a desired position.

This alternate positioning of said plurality of gears 20 forces the, pieces of rubber to be bent parallel to the shaft 18. Since the space between each aligned gear 20 is large, they are not capable of intermeshing with each other, and both shafts 18 are driven independently. Preferably, gears 20 are made of stainless steel or other similar material.

However, the present invention is not restricted to assembly shown on FIGS. 6 and 7. For example, those gears 20 and spacers 22 may be casted into unitary moduls (not shown) consisting of several gears and spacers connected together. In all other aspects such assembly are similar to one shown on FIG. 6.

One of each set of rolls is adapted to be adjustable towards its counterpart to decrease or increase the distance between them depending on the thickness of pieces tires to be processed. Mounting shafts 18 are attached to a corresponding gearbox (not shown), and is driven by a variable speed motor.

The present invention is not restricted to a symmetrical step-like shape of the gears and any other configuration providing maximum bending surface for breaking pieces of rubber may be employed without departing from the spirit of the present invention.

Figure 10:
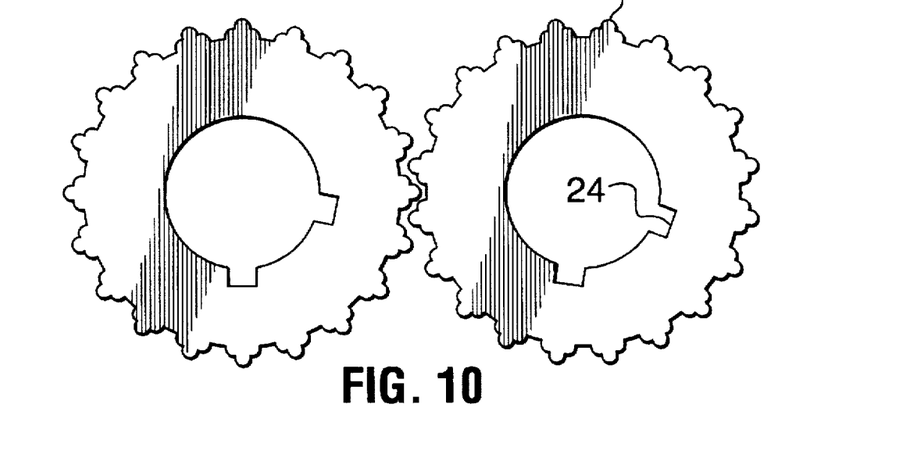
FIG. 10 is a side view of second modification of the second set of rolls.

FIG. 10 shows second modification of second set of rolls wherein teeth of gears 32 having edges of rounded configuration.

In case of disintegrating truck tires, an additional set of rolls similar to one shown on FIG. 2 may be used. The only one difference is that this set of rolls will have bigger heads of screws and larger spaces between any two parts of those shafts.

Figure 8:
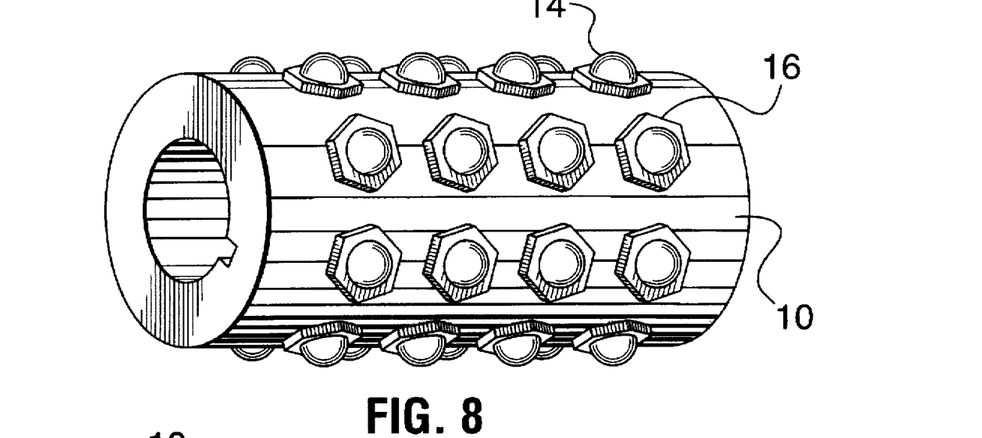
FIG. 8 is a perspective view of second modification of the first set of rolls.
Figure 9:
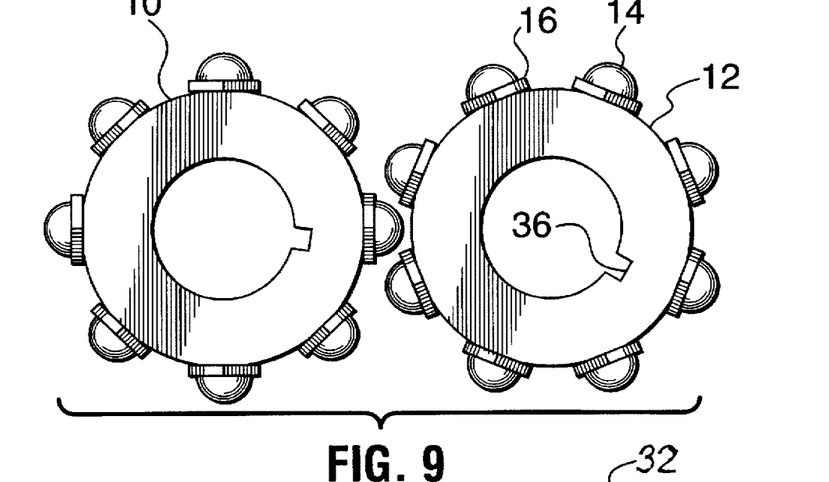
FIG. 9 is a side view of second modification of the first set of rolls.

FIGS. 8 and 9 show a second modification of the first set of rolls, wherein each head 14 is mounted on a base element 16, such as hexagonal nut. The presence of such base elements 16 is provided to additionally enhance bending and breaking of frozen segments of tires being advanced between rolls 10 and 12. However, the configuration of those base elements 16 is not restricted to hexagonal nuts, and any other configuration may be used on the condition that such base element is provided with breaking surfaces.

Figures 11, 12:
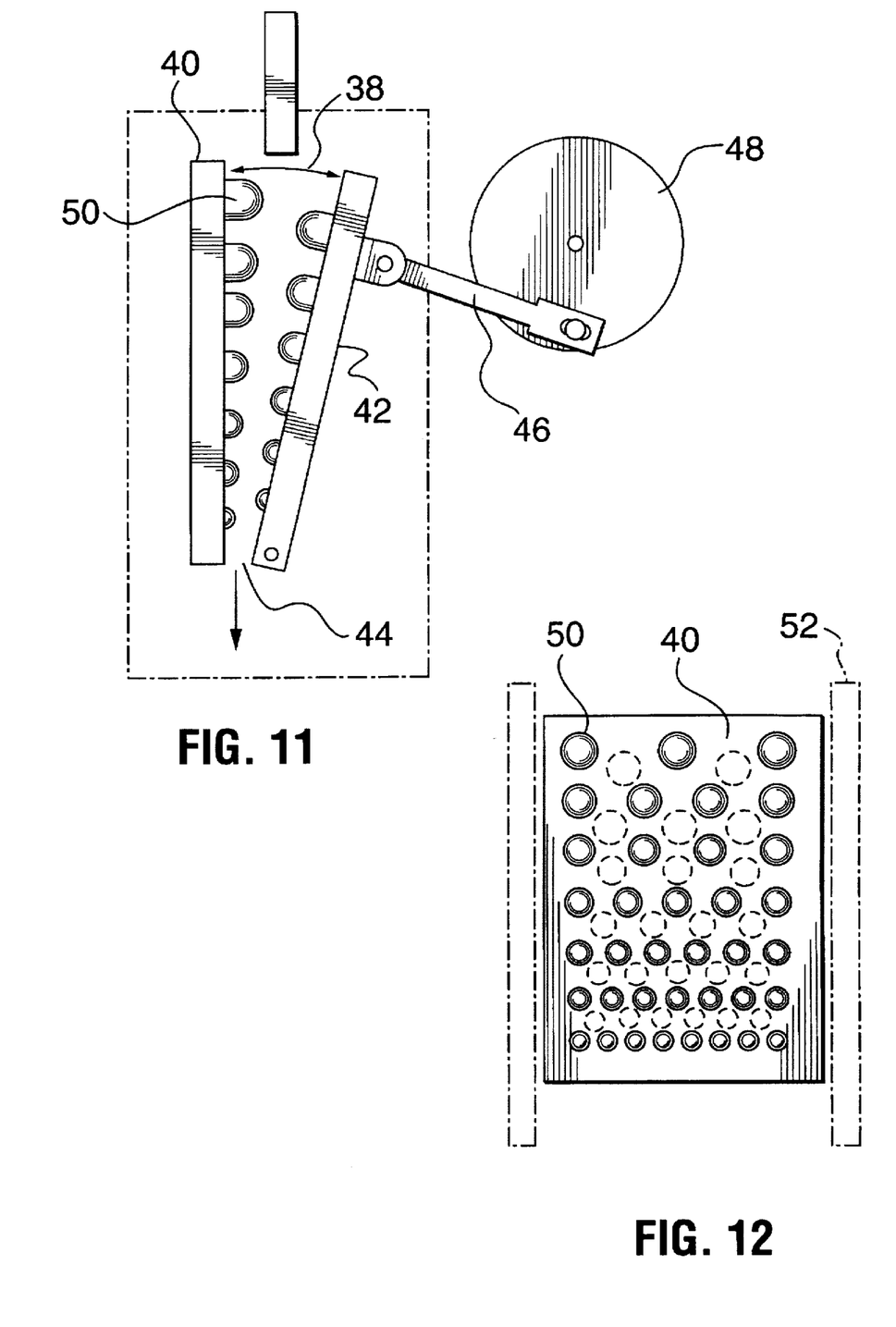
FIG. 11 is a side view of the second modification of the present embodiment showing set of jaws.
FIG. 12 is a front view of one of the jaws of FIG. 11.

FIGS. 11 and 12 show a second modification of the present invention, wherein instead of a set of rolls, the disintegration means comprises a jaw-type crusher 38 consisting of a stationary jaw 40 and a movable jaw 42 of a generally rectangular configuration. The inner surfaces of those jaws 38 and 40 are provided with a plurality of protrusions 50 which facilitate bending and breaking of segments of thermoplastic materials advanced between the jaws 40 and 42. The size and distance between the protrusions 50 decreases gradually from the entrance to the exit 44 of crusher 38.

This is done because the segments of thermoplastic material entering the crusher are larger in size than particles which are closer to the exit 44. The most important concern of the present embodiment is that the size and spacing between protrusions 50 should be less than the thickness of the material to be disintegrated. Protrusions 50 are spaced in rows horizontally and perpendicularly to the flow of material to be processed. These rows are progressively smaller on the jaw crusher's inner surfaces in the direction of the exit opening 44 at the bottom of crusher 38.

Movable jaw 42 is also adjustable in distance, thus allowing adjustment of the size of the exit discharge opening 44. In the preferred embodiment, the movable jaw 42 is driven by means of an arm 46 connected to a linear type of reciprocating motion device 48. However, the present invention is not restricted to such an arrangement, and any other equivalent system could be used to bring to the same result. The jaw crasher is placed in a heavy frame 52 to facilitate support of the mechanism and adapted to contain a flow of material in the area near the opening on the crusher 38. On FIG. 12 solid circles show protrusions 50 on the inner surface of movable jaw 42 and broken-line circles are those of stationary jaw 40.

If complete disintegration of material is necessary, two sets of jaw crushers 38 may be used. The equipment for separation of the processed material is located directly under the first set of crashers 38. For separation of magnetic materials (steel wires) a magnetic drum is used, and for separation of non-magnetic wires (such as copper), an air flow knife is used. The discharge from the metal separator would fall directly into a second set of jaw crusher 38 which has smaller protrusions 50, smaller spacing between the protrusions, and a smaller discharge exit 44 for finer disintegration. This second set of jaws or crashers 38 is similar to the first set of jaws 38 in all respects. The discharge from the second crasher 38 would go directly onto a screen for separation of fibre from powdered brittle particles of thermoplastic material.

The maximum disintegration (size reduction) of the tire rubber is provided with the minimum energy consumption, wherein the tires are preliminary frozen to their "glass point", and a bending force is applied by means of a number of sets of rolls which are made to handle progressively smaller portions of rubber. In view of the fact that no cutting action is used, the steel wires are not cut at all; this eliminates the need for large amounts of energy, massive equipment, and frequent resharpening of cutting surfaces. The present system does not grind, impact or compress the rubber; it only bends and thereby breaks it, which is a very important feature of the present invention.

Figure 1:
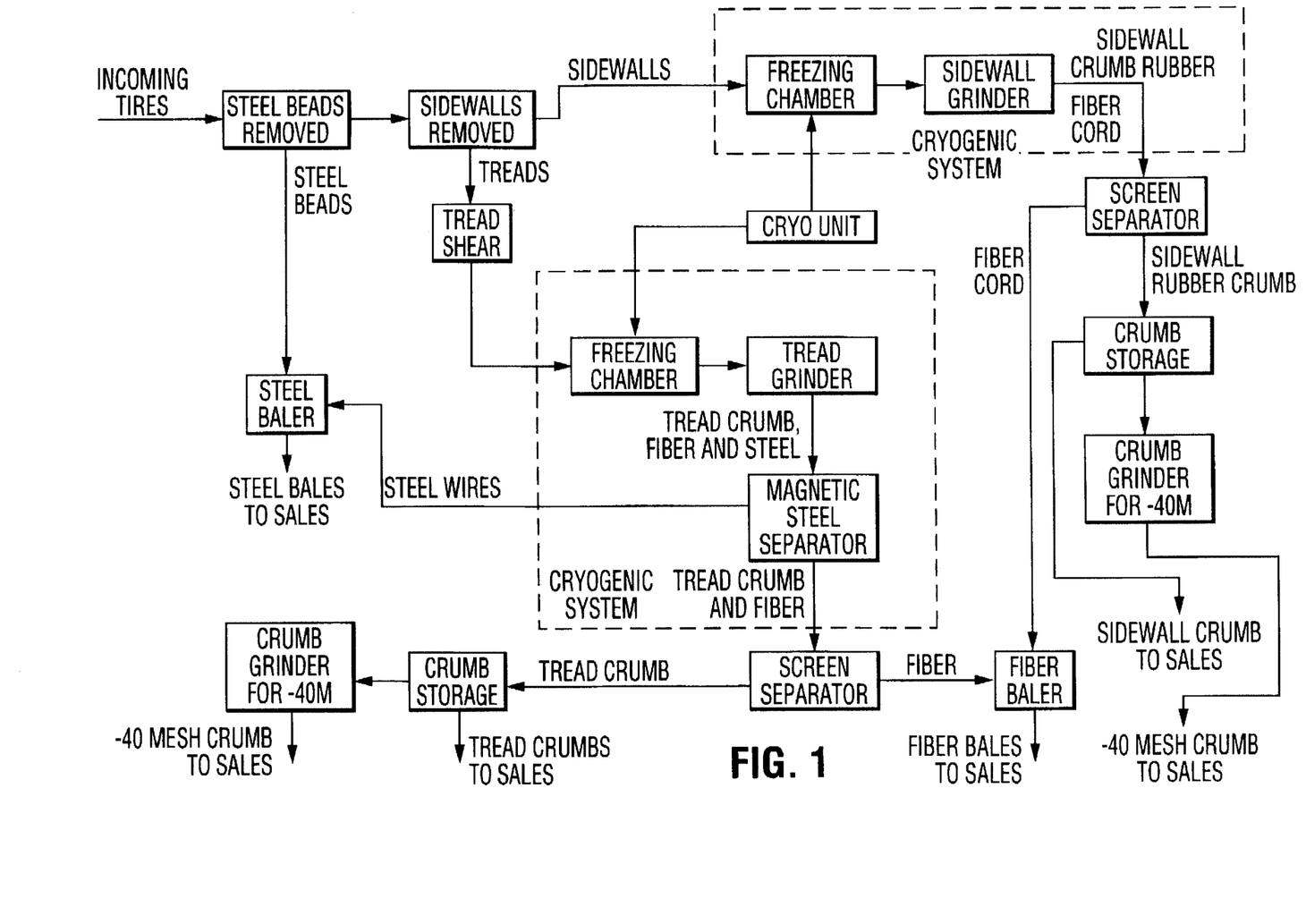
FIG. 1 shows a schematic block diagram of the complete cryogenic tire disintegrating system according to the present invention.

The process of disintegration of tires according to the present invention is shown on schematic block-diagram of FIG. 1.

1. Firstly, the tires are placed into a tire preparation machine where they are cleaned and dried. Next, the two steel beads are pulled from each tire; then, two side walls are cut off, and the tread is cut in half lengthwise giving pieces from 6" to 1'6" long. The steel beads are conveyed to a baler.

2. The sidewalls and treads are kept separate from each other throughout the processing. They are automatically placed on conveying systems and are fed into the tire disintegration system through air locks.

3. The sidewall and tread sections pass through separate air locks and enter their freezing chambers. Here, air at −170 degrees Fahrenheit is constantly recirculated from a refrigeration unit, reducing the temperature of the tire sections to −90 to −100 degrees Fahrenheit.

4. The frozen tire sections are broken in a number of sets of rolls that reduces them into a coarse powder leaving the steel wires and fibre thread practically intact. As the rubber shatters or breaks, the pieces are now smaller than the original thickness, so that the knobs, heads or gears on the second set of rolls are smaller and closer together, and the space, between the rolls is closer. The main purpose is to cause each piece to try to bend, and since it is extremely brittle (like glass) and thus cannot bend; instead, it breaks. As the rubber shatters, it releases the string-like fibre and the steel wires, which make up the steel belting. At no time do the knobs or gears shear or cut any steel. Some fibre may break, but that is of no consequence. This process is very energy efficient, since the energy required to break or shatter rubber when frozen is 5% of the energy required to tear it apart at room temperature. The size of the final crumb is determined by the spacing of the last set of rolls and the size of the knobs or teeth on them.

5. The steel wires are magnetically removed and conveyed out of the machine to the steel baler.

6. The fibre thread is separated from the rubber by screens and further conveyed out of the machine to a fibre baler.

7. The sidewall and thread powders are each conveyed through heat exchange systems which are provided to extract the cold energy and transfer it back to the incoming tire sections in the freezing chambers.

8. The rubber powders exiting the machine will be 100%–10 mesh. If desired, a supplemental conventional grinder may be installed for bringing the powder down to −40 mesh and −80 mesh.

The sidewalls and treads are kept separate in view of the fact that sidewalls contain more natural rubber than treads, which makes the powder more valuable.

All final products, such as rubber powder, steel wires and fibre strings are sellable, which represents a great advantage of the present invention. The present system will process auto and track tires to equivalent of 1 million tires per year and allows to operate continuously around the clock. Maintenance shutdowns will be of a short duration. The system will consume about 450 HP operating at 440 V. It is designed to be portable and may be transported on lowboy trailers. It will be entirely enclosed in a sealed aluminum shell, the only openings being for tread and sidewalls inlets, and steel, fibre and powder outlets.

The present invention having a following advantages:

A highly efficient cooling process allowing to drastically reduce the cost of the refrigerant.

A unique non-shredding multi-stage sets of rolls providing a tire disintegration system which is environmentally safe and pollution-free, and allows to produce rubber powder of a wide range of particle sizes which enable to meet a variety of market demands;

The production of clean steel wire, fibre cord and rubber powder uncontaminated by each other;

A extremely efficient, low energy system;

Low capital cost;

Low maintenance;

Does not convert the fibre cord into fluff; which entraps steel and rubber crumb, thus causing losses.

The problems to avoid by using the system of the present invention are as follows:

In view of the fact that any pieces of metal larger than the space between the closest rolls (last set) will damage the rolls the metal must be removed by means of a magnetic separator after the first set of rolls. Also, visual inspection of the tires is necessary to detect and remove (manually) large bolts, screws, etc. that may be harmful even for the first set of rolls;

The tire must be cleaned because any dirt will follow through the entire system and mix with the crumbs;

The tires should have no free water on them since this will cause formation of ice and eventually will wet the final crumb;

Sidewalls should be completely free from any steel wires.

Thus, it can be seen that the objects of the present invention have been satisfied by the structure presented hereinabove. While in accordance with the Patent Statutes, only the best mode and preferred embodiments of the present invention has been presented and described in detail, it is to be understood that the invention is not limited thereto or thereby. Accordingly, for an appreciation of the true scope and breadth of the invention, references should be made to the following claims.

We claim:

1. Method for disintegration of thermoplastic elastomeric materials containing fibres and wires comprising:

subjecting segments of said elastomeric materials to temperatures able to bring only thermoplastic elastomeric component of said segments into a brittle glass-like state;

gradual fracturing of said frozen segments provided to separate and release said elastomeric component from said wires and fibres, wherein said fracturing is effected by means of a bending force applied to said frozen segments causing said elastomeric component to be broken into small particles at a natural fracture planes without exertion of any compression force to said segments, and wherein said wires and fibres become released from said elastomeric component and remain substantially intact;

separating said small particles and said intact wires and fibres.

2. Method according to claim 1, wherein said gradual fracturing comprises passing said frozen segments through a roll means provided with mating bending surfaces spaced apart from each other at predetermined distances and facilitating maximum bending and breaking of said frozen segments being advanced between said roll means.

3. Method according to claim 2, wherein said frozen segments being passed through a first set of two rolls and a second set of two rolls, wherein distance between said first set of rolls is bigger than the distance between said second set of rolls to facilitate gradual breaking of said frozen segments advanced between said corresponding set of rolls.

4. Method according to claim 2, wherein said frozen segments being passed through an additional set of first rolls provided to break said frozen segments of larger size, wherein said additional set of first rolls is positioned prior to said first set of rolls.

5. Method according to claim 1, wherein said separation step comprising separation of said intact wires, separation of small particles of said thermoplastic component and separation said intact fibres.

6. Method according to claim 5, wherein separated small particles of said thermoplastic elastomeric component are conveyed through a heat exchange means provided to extract a cold energy from said particles and transferring said energy back into an incoming section of a preparation chamber.

7. Method according to claim 1, wherein said segments are frozen by means of cooled air circulating under $-170°$ F. and said frozen segments are subjected to temperatures between $-90°$ and $-100°$ F.

8. Method according to claim 1, wherein said segments of thermoplastic elastomeric material are tire treads, wherein said tire treads are preliminary separated from sidewall portions of said tires.

9. Apparatus for disintegration of thermoplastic elastomeric material containing wires and fibres comprising:

a freezing chamber provided to subject segments of said thermoplastic material to a temperature able to bring into a brittle glass-like state only the thermoplastic elastomeric component of said segment;

fracturing means having mating bending surfaces which are shaped to gradually fracture said frozen segments and allowing to completely separate and release said thermoplastic elastomeric component of said segments from said wires and fibres, said fracturing is effected by a bending force applied to said frozen segments being advanced between said bending surfaces, thus causing said segments to be bent and said elastomeric component to be broken into small particles at a natural fracture planes without exertion of any compression force to said segments, and wherein said wires and fibres are released from said small particles and remain substantially intact;

wherein said fracturing means comprise a roll means, said roll means provided with mating bending surfaces spaced apart from each other at predetermined distance and facilitating maximum bending and breaking of said frozen segments being advanced between said roll means;

separation means adapted to completely separate said small particles of thermoplastic elastomeric component, said intact wires and said fibres.

10. Apparatus according to claim 9, wherein said roll means comprises a first set of two rolls and a second set of two rolls, wherein distance between said first set of rolls is bigger than the distance between said second set of rolls to facilitate gradual breaking of said frozen segments advanced between said corresponding set of rolls.

11. Apparatus according to claim 10, wherein mating bending surfaces of said first set of two rolls comprise a plurality of semi-spherical heads incorporated onto said mating surfaces, wherein said heads are spaced from each other in such a way that heads on the mating surface of one roll are mating with a space between heads on the mating surface of another roll.

12. Apparatus according to claim 11, wherein said roll means further comprises an additional set of first rolls provided to break frozen segments of larger size, wherein said additional set of first rolls is positioned prior to said first set of rolls.

13. Apparatus according to claim 12, wherein heads of said additional set of first rolls have dimensions larger than the dimensions of said first set of rolls, and wherein said additional rolls are spaced from each other at a larger distance.

14. Apparatus according to claim 10, wherein said second set of two rolls comprises a plurality of gear-shaped disks mounted on said rolls, said disks having teeth of a step-like configuration, and wherein disks on one roll are adapted to intermesh with corresponding disks on another roll in such a way that a peak portion of a tooth's working surface of one roll is facing a valley portion of the tooth's working surface of the corresponding disk of another roll, thus providing maximum bending force applied to said frozen segments being advanced between said working surfaces.

15. Apparatus according to claim 14, wherein said gear-shaped disks assembled on each of said rolls are spaced from each other by means of spacers, wherein said spacers facilitate bending and breaking of said frozen segments in a plane parallel to said rolls.

16. Apparatus according to claim 14, wherein said gear-shaped disks are assembled such a way that each even disk is rotated with relation to each odd disk so that the peak and valley working surfaces of said adjacent odd and even disks alternate, thus allowing to further facilitate bending and breaking of said frozen segments in a plane parallel to said rolls.

17. Apparatus according to claim 14, wherein teeth of said gear-shaped disks have edges of rounded configurations.

18. Apparatus according to claim 14, wherein teeth of said gear-shaped disks have a symmetrical configuration.

19. Apparatus according to claim 10, wherein each roll of said first and second set of rolls is driven independently from each other.

20. Apparatus according to claim 9, wherein said separation means further comprises a magnetic means adapted to separate said wires and a screen means adapted to separate said small particles of the thermoplastic elastomeric component and said fibres.

21. Apparatus according to claim 9, wherein the distance between said roll means is smaller than the thickness of the frozen segments being advanced between said roll means.

22. Apparatus for disintegration of thermoplastic elastomeric material containing wires and fibres comprising:

a freezing chamber provided to subject segments of said thermoplastic material to a temperature able to bring into a brittle glass-like state only thermoplastic elastomeric component of said segment;

fracturing means having mating bending surfaces which are configured to gradually fracture said frozen segments and allowing to completely separate and release said thermoplastic elastomeric component of said segments from said wires and fibres, said fracturing is effected by a bending force applied to said frozen segments being advanced between said bending surfaces, thus causing said segments to be bent and said elastomeric component to be broken into small particles at a natural fracture planes without exertion of any compression force to said segments, and wherein said wire and fibres are released from said small particles and remain substantially intact;

wherein said fracturing means comprises a jaw means, said jaw means are provided with mating bending surfaces spaced apart from each other at predetermined distance and facilitating maximum bending and breaking of said frozen segments being advanced between said jaw means;

separation means adapted to completely separate said small particles of thermoplastic elastomeric component, said intact wires and said fibres.

23. Apparatus according to claim 22, wherein said jaw means comprise a set of two jaws of a generally flat configuration, wherein one of said two jaws is a stationary jaw and the second of said two jaws is a movable jaw, and wherein said bending surfaces comprise a plurality of protrusions incorporated into inner surfaces of said jaws, said protrusions are spaced from each other in such a way that protrusions on the mating surface of one jaw are mating with a space between protrusions on the mating surface of another jaw.

24. Apparatus according to claim 23, wherein the size and the distance between said protrusions gets progressively smaller in the direction toward an exit opening located near the bottom portions of the said two jaws.

25. Apparatus according to claim 24, wherein the size and the distance between said protrusions is smaller than the thickness of the frozen segments being advanced between said jaws.

* * * * *